No. 676,811. Patented June 18, 1901.
B. ABEL.
SPEED REGULATOR FOR GAS ENGINES.
(Application filed July 21, 1900.)
(No Model.) 6 Sheets—Sheet 1.

Witnesses.
L. M. Billings.
G. A. Neubauer.

Inventor.
Barnard Abel.
By James Sangster
Attorneys

No. 676,811.  
B. ABEL.  
SPEED REGULATOR FOR GAS ENGINES.  
(Application filed July 21, 1900.)  
Patented June 18, 1901.
(No Model.) 6 Sheets—Sheet 2.
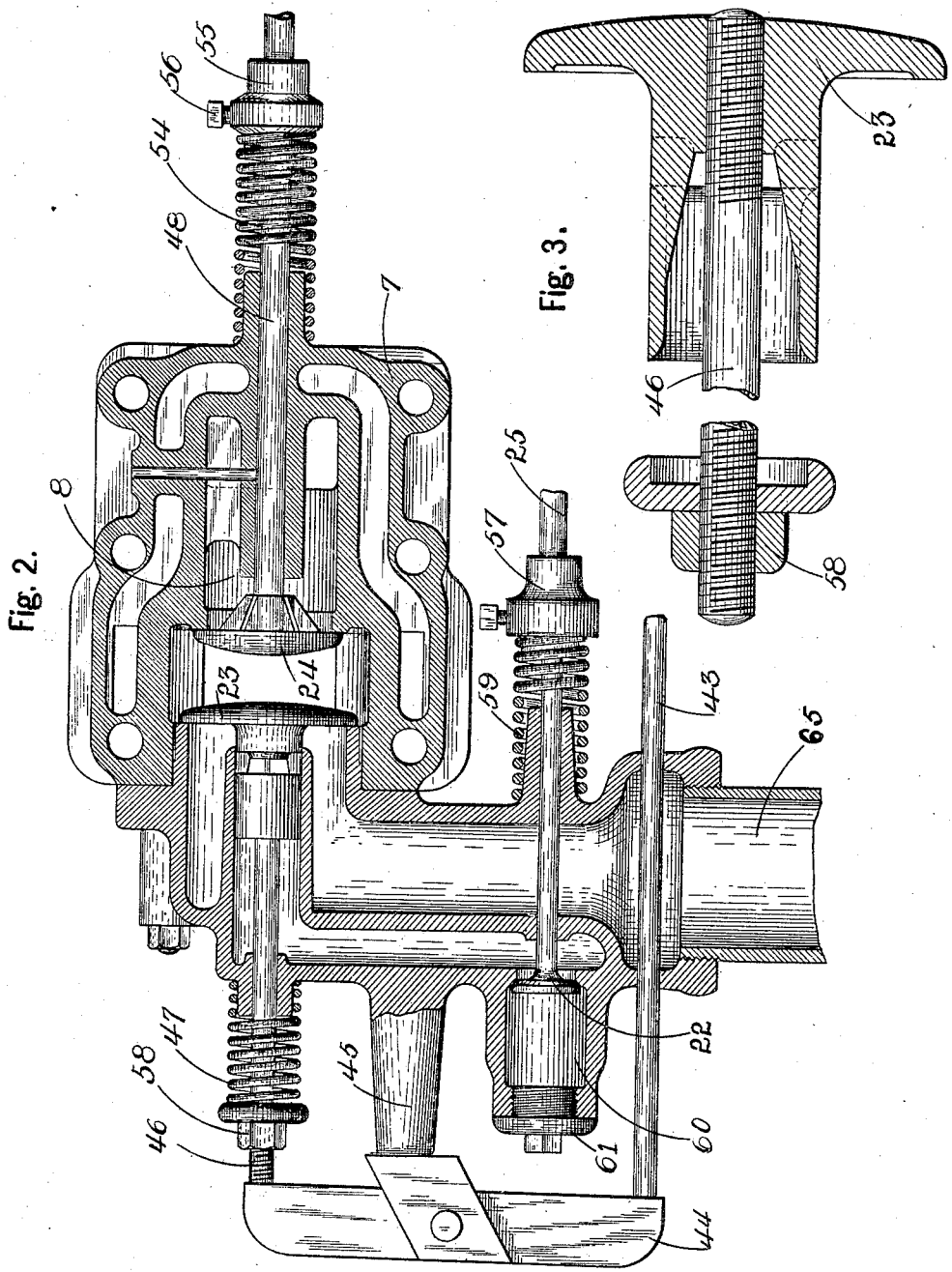
Witnesses.
L. M. Billings
G. A. Neubauer
Inventor,
Barnard Abel.
By James Langston
Attorneys

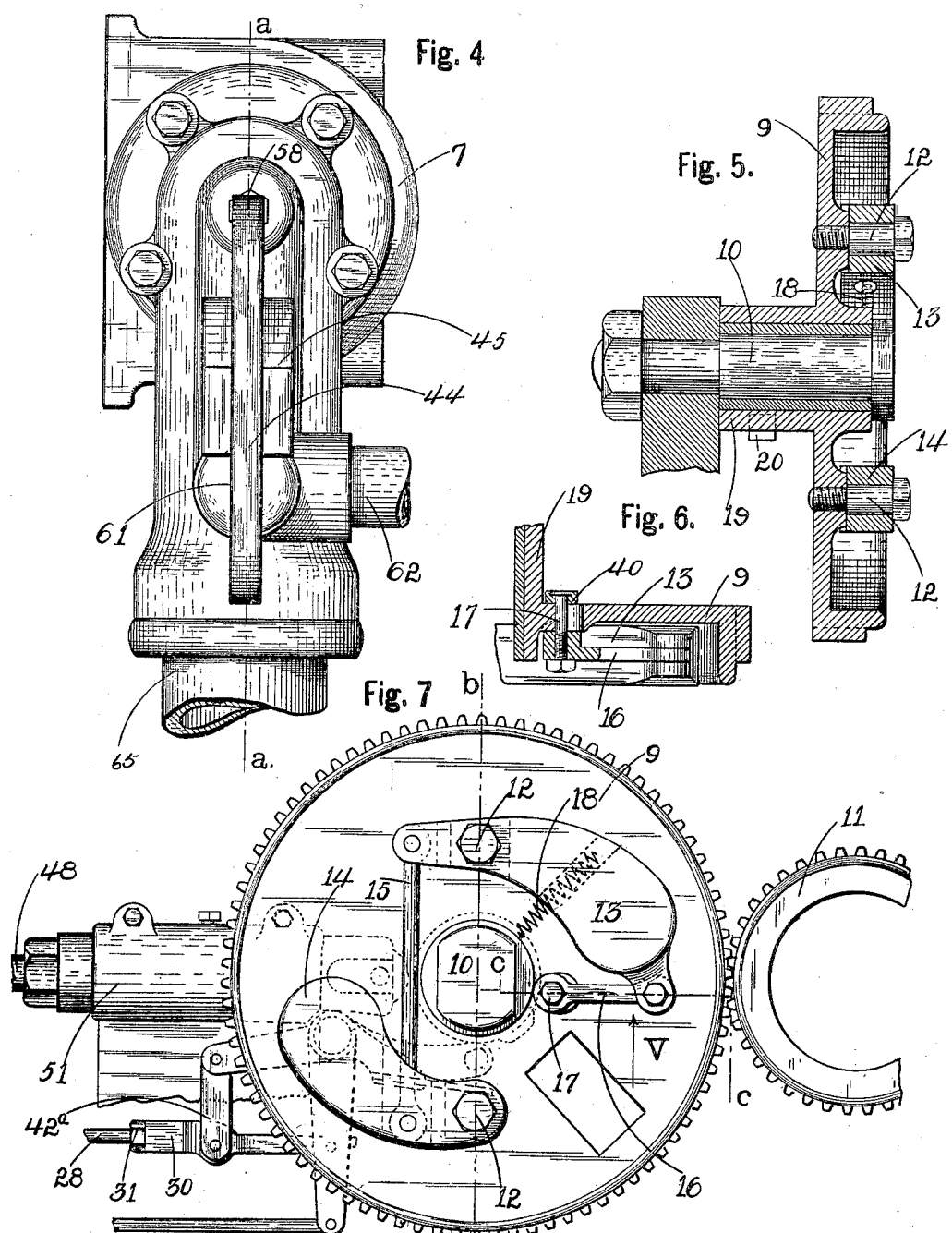

No. 676,811. Patented June 18, 1901.
B. ABEL.
SPEED REGULATOR FOR GAS ENGINES.
(Application filed July 21, 1900.)
(No Model.) 6 Sheets—Sheet 4.
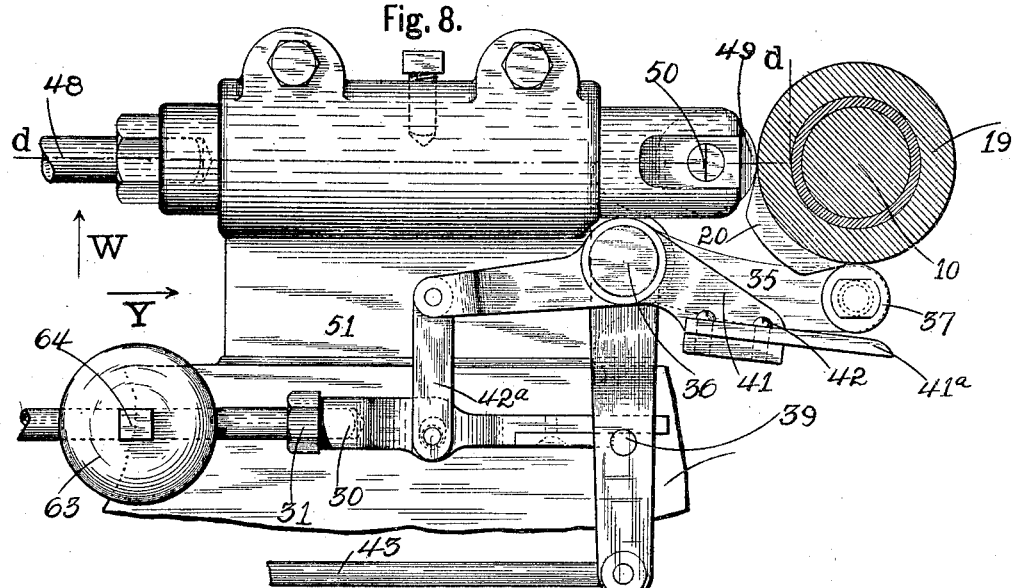
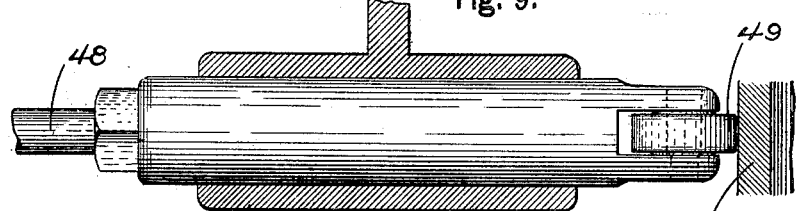
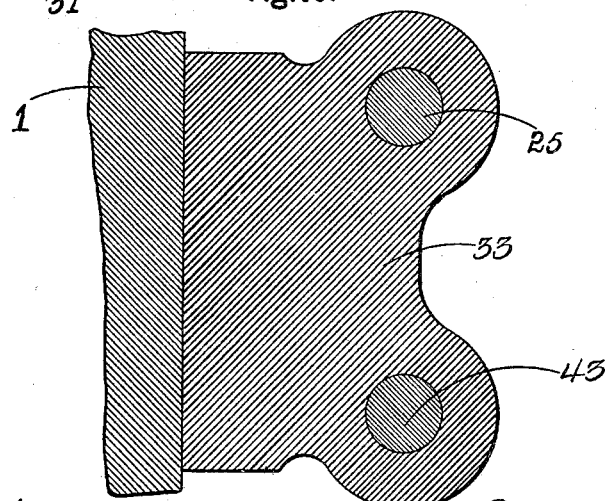
Witnesses. Inventor.
L. M. Billings Barnard Abel.
G. A. Neubauer By James Sangster Attorneys No. 676,811.  
B. ABEL.  
SPEED REGULATOR FOR GAS ENGINES.  
(Application filed July 21, 1900.)  
(No Model.)  
Patented June 18, 1901.  
6 Sheets—Sheet 5.
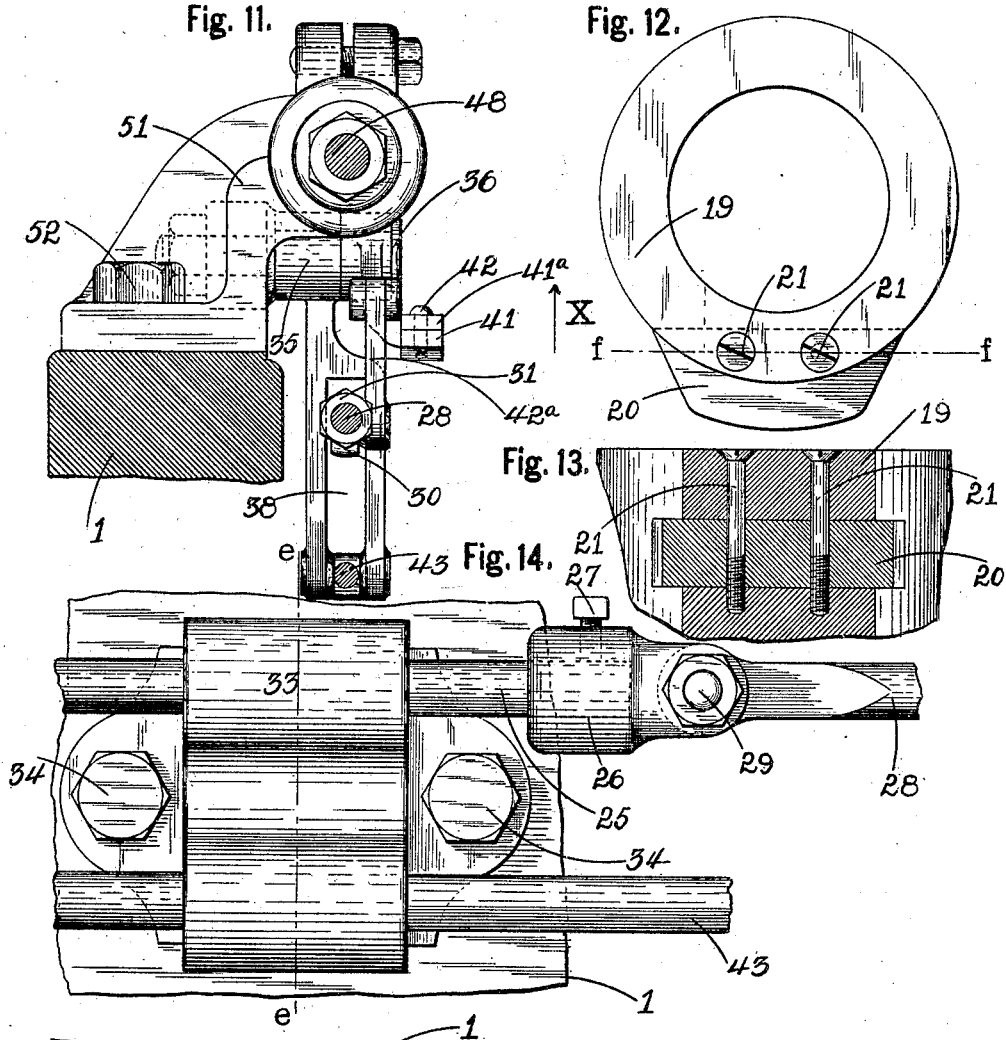
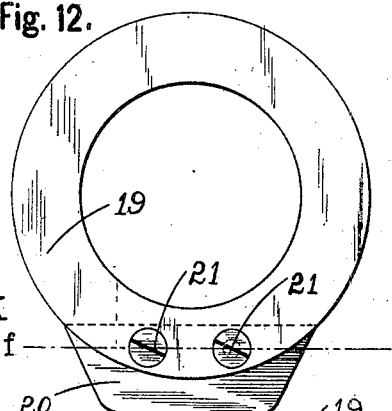
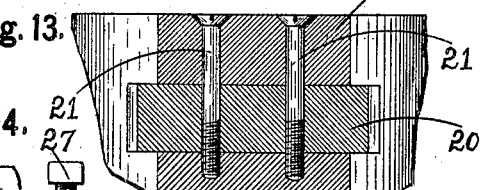
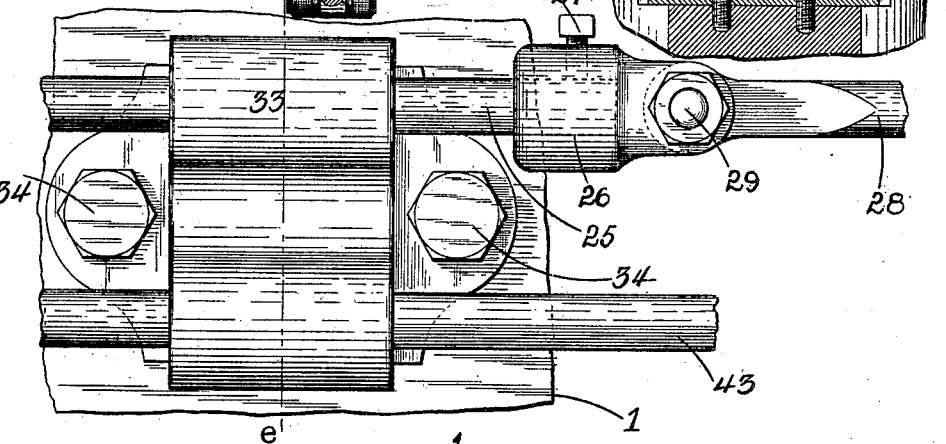
Witnesses.  
L. M. Billings  
G. A. Neubauer
Inventor.  
Barnard Abel.  
By James Sangster  
Attorneys No. 676,811. Patented June 18, 1901.
B. ABEL.
SPEED REGULATOR FOR GAS ENGINES.
(Application filed July 21, 1900.)
(No Model.) 6 Sheets—Sheet 6.

Witnesses.
L. M. Billings
G. A. Neubauer

Inventor.
Barnard Abel.
By James Sangster
Attorneys

UNITED STATES PATENT OFFICE.

BARNARD ABEL, OF TITUSVILLE, PENNSYLVANIA, ASSIGNOR TO THE TITUSVILLE IRON CO., OF SAME PLACE.

SPEED-REGULATOR FOR GAS-ENGINES.

SPECIFICATION forming part of Letters Patent No. 676,811, dated June 18, 1901.

Application filed July 21, 1900. Serial No. 24,405. (No model.)

*To all whom it may concern:*

Be it known that I, BARNARD ABEL, a citizen of the United States, residing at Titusville, in the county of Crawford and State of Pennsylvania, have invented certain new and useful Improvements in Gas-Engines, of which the following is a specification.

My invention relates to an improved gas or gasolene engine; and one of the principal objects of the invention is to provide a simple governing device which is automatically operated by centrifugal action.

The invention also relates to the construction and arrangement of different operating parts, all of which will be fully hereinafter described.

For a full understanding of the merits and advantages of the invention reference is to be had to the accompanying drawings and the following description.

The invention is susceptible to various changes in the form, proportion, and minor details of construction without departing from the principle or sacrificing any of the advantages thereof, and to a full disclosure of the invention an adaptation thereof is shown in the accompanying drawings, in which—

Figure 1:
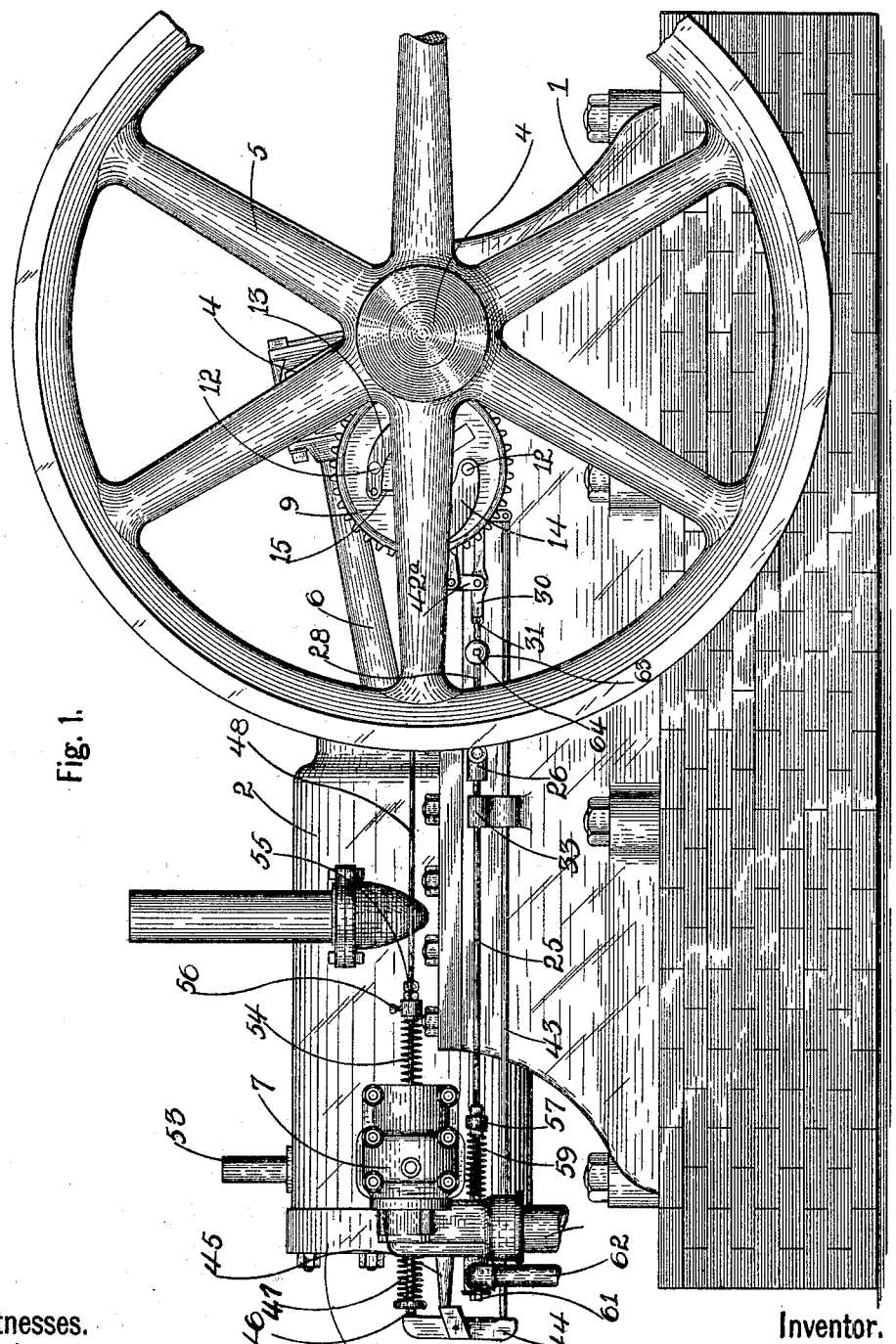
Figure 16:
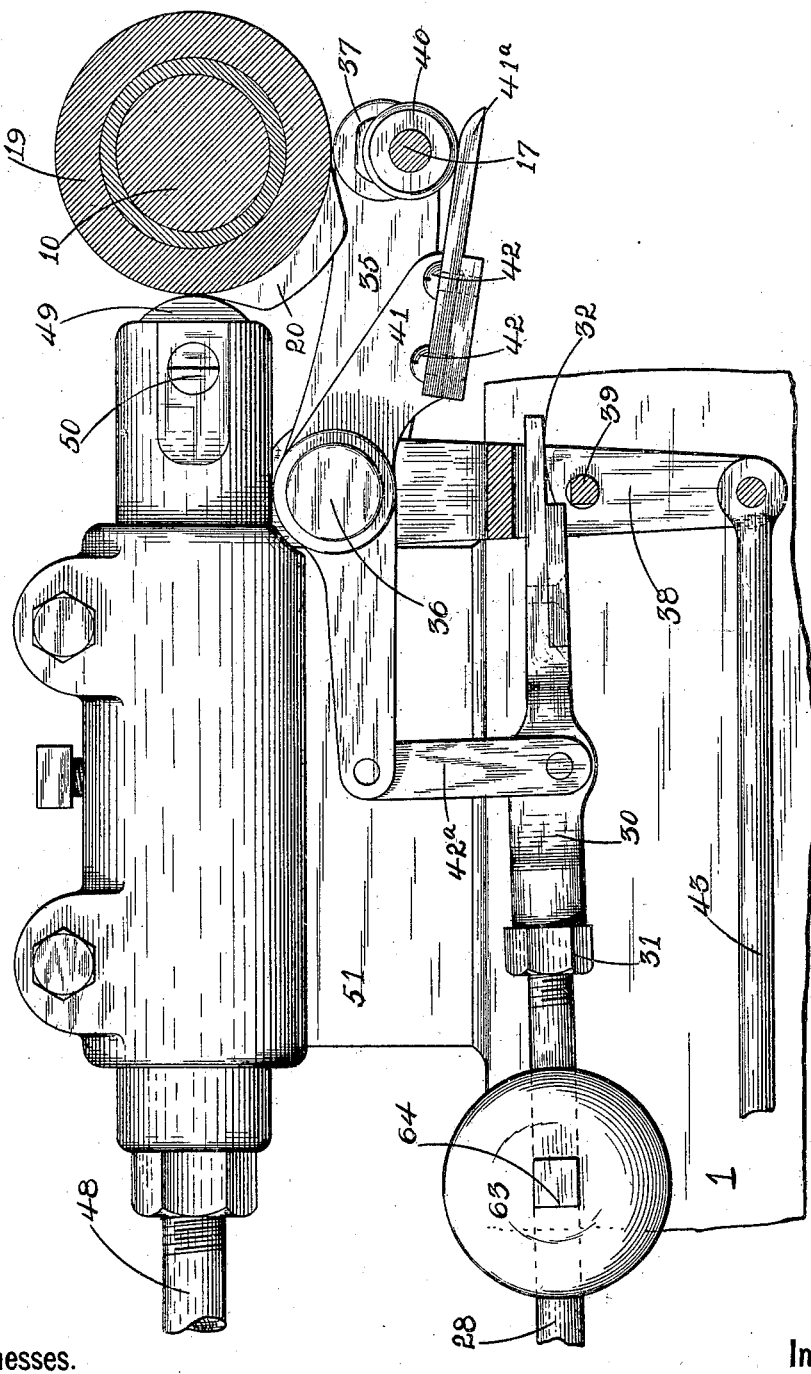

Figure 1 represents a side elevation of my improved engine. Fig. 2 is an enlarged vertical section through the valve-chest on or about line $a\,a$, Fig. 4. Fig. 3 is a fragmentary enlarged central longitudinal section through one of the puppet-valve parts. Fig. 4 is a detached side elevation of the valve-chest. Fig. 5 is a section on or about line $b\,b$, Fig. 7. Fig. 6 is an enlarged fragmentary section on line $c\,c$, Fig. 7, looking in the direction of the arrow V. Fig. 7 is an enlarged detached side elevation of the centrifugal speed-governing mechanism. Fig. 8 is an enlarged detached side elevation of the cam-operated mechanism controlling the puppet-valves, also showing a section through the driving-shaft and a fragment of the supporting-frame. Fig. 9 is a section on line $d\,d$, Fig. 8, looking in the direction of the arrow W. Fig. 10 is a section on line $e\,e$, Fig. 14. Fig. 11 is an end elevation of a fragment of the valve-operating mechanism looking in the direction of the arrow Y, Fig. 8. Fig. 12 is an enlarged detached view of the valve-operating cam. Fig. 13 is a section through the valve-operating cam on line $f\,f$, Fig. 12, looking in the direction of the arrow X. Fig. 14 is a side elevation of the bracket-box in which the puppet-valve rods are supported and slide, also showing fragments of the rods and frame. Fig. 15 is a top view of the parts shown in Fig. 14. Fig. 16 is an enlarged fragment of the frame and valve parts and operating mechanism, showing the gas-valve operating mechanism in its elevated inoperative position.

In referring to the drawings in detail like numerals designate like parts.

1 is the frame, 2 the cylinder, 3 the cylinder-head, 4 the cranked driving-shaft, 5 the driving-wheels, and 6 the connecting-rod, all of which are of the usual construction.

7 represents the valve-chest, having a valve-chamber 8.

9 is a gear-wheel mounted on a short secondary shaft 10, journaled in one side of the frame and meshing with a gear-wheel 11, mounted on the main driving-shaft 4.

The wheel 9 is recessed on its outer face and carries angular centrifugally-swinging weight-governing arms, which are pivoted to the wheel by the bolts 12. Two of these angular arms 13 and 14 are preferably employed, being on opposite sides of the center of the wheel and connected to each other, so as to operate in unison, by the connecting-rod 15. (See Fig. 7.) The arm 13 is pivoted to the recessed face of the wheel near one end thereof, and the connecting-rod 15 is attached to the short end portion of said arm on one side of said pivoting-point, a rod 16 being connected to the opposite end and having a pin or bolt 17 projecting through a short radial slot in the wheel to limit the outward surging movement of the larger and heavier portions of the arms 13 and 14. (See Fig. 6.) A spiral spring 18, which is attached to the hub of gear 9 and extends into a depression in the arm 13, (shown in dotted lines in Fig. 7,) being fastened at its outer end in said depression, serves to normally retain the swinging arms in their inoperative position. A cam is rigidly mounted upon the secondary shaft 10 and preferably consists of an annular flange 19, formed integral with the wheel 9 and having a slot or depression in which a cam-block 20, of hardened metal, is inserted and secured by the screws or bolts 21. (See Figs. 12 and 13.) All of the valves employed are preferably of the puppet type. The valve-chamber is provided with a lower gas-valve 22, an upper gas and air valve 23 for admitting the gas and air into the engine-cylinder, and an upper exhaust-valve 24. All of these valves are operated by the action of the cam upon their connecting-rods. The lower gas-valve 22 has a horizontal connecting-rod, the rear end of the forward part 25 of which is inserted in a socket in a metal block or part 26 and fastened therein by the locking-bolt 27, the rear end of said metal block 26 being bifurcated and the short intermediate part 28 having its front end pivoted in said bifurcation by the bolt 29, substantially as shown in Figs. 14 and 15, and the rear part 30 is provided with a screw-threaded socket in which the rear end of the intermediate part screws, being fastened in its position by the lock-nut 31. The rear extreme of the rear part is cut away to form a reduced end, substantially as shown in Fig. 16, which terminates in a vertical shoulder 32. The forward part 25 of the connecting-rod passes through the upper opening or slideway in the bracket 33, bolted to the frame by bolts 34. (See Figs. 14 and 15.) An angular rock-arm 35, which is pivotally mounted on a pin 36, carries a roller 37 at its rear end which engages with the cam and is provided with a longitudinal slot 38 in its vertical forward portion, and a pin 39 extends horizontally across the slot. (See Fig. 16.)

The gas-valve connecting-rod is so arranged that when in operative position the reduced end of its rear part rests on the pin 39, the shoulder 32 being against the vertical side of the pin, substantially as shown in dotted lines in Fig. 8.

A roller 40 is mounted upon the inner end of the pin or bolt 17, and an arm 41 is pivotally mounted on the pin 36 and has an outwardly-extending flat part 41$^a$, secured to its rear end by the bolts or screws 42 (see Fig. 16) and arranged to contact with the roller 40 when the arms 13 and 14 are swinging into their outward position by centrifugal force. A link 42$^a$ is pivotally connected at its respective ends to the forward end of the arm 41 and to the rear part 30 of the connecting-rod and serves to lift the rear end of the rod out of operative position relatively to the pin 39, substantially as shown in Fig. 16.

The gas and air valve 23 is operated by the rocking of the angular arm 35, a connecting-rod 43 being connected to the lower ends of the angular arm 35 and a lever 44, pivoted on a projection 45, extending from the valve-chest, and the stem 46 of the valve having connection with the upper end of the lever 44, (see Fig. 2,) the valve being normally held in a closed position by a spring 47, mounted on the valve-stem. The tension of the spring 47 is regulated by the nut 58 on the screw-threaded end of the stem. The connecting-rod 43 passes through the lower opening or slideway in the bracket 33.

The valve 24 has a long stem 48, which extends horizontally rearward and is provided with an enlarged slotted rear extreme in which a roller 49 is journaled on a pin 50. This roller 49 is in contact with the cam 20, and the stem 48 is given a forward movement by the cam coming in contact with the roller, thereby opening the valve. The rear end of the stem 48 slides in the supporting-bracket 51, which is fastened to the frame by the bolts 52.

The engine is provided with an igniting device 53, which may be of any well-known form.

A spring 54 is placed upon the stem 48 and serves to maintain the valve 24 in a normally closed position, said spring being tensioned by the collar 55, slidably mounted on said stem 48 and locked in its adjusted position by the set-screw 56. A collar 57 is also mounted upon the stem 25 of the valve 22 and serves to tension and maintain a spring 59 in place on said stem 25, said spring normally holding the valve 22 in a closed position with a spring force.

The gas-chamber 60 has its outer end closed with a screw-cap 61, gas being admitted into said chamber through its side by means of the gas-pipe 62.

To regulate the governing mechanism so that it will act at various speeds, a weight 63 is slidably mounted on the gas-valve connecting-rod, the movement of which in one direction or the other serves either to lessen or increase the power required to raise the rod. The weight is secured in its adjusted position on the rod by a set-screw 64. Air is admitted to the gas-chamber through the pipe 65.

The operation of the engine is as follows: The engine being started the various valves are operated regularly by the driving-shaft to maintain the engine in automatic action until the speed becomes greater than desired. Then centrifugal action throws the ends of the arms 13 and 14 outward and forces the roller 40 from the center. The roller now presses upon and tilts the flat extension 41$^a$ of the rock-arm 41, and by means of the link connection 42$^a$ raises the end 30 of the connecting-rod of the gas-valve above and out of operative influence of the pin 39, that the forward oscillation of the arm 35 cannot open the gas-valve.

I claim as my invention—

1. A gas-engine having a cylinder, a gas-chamber, a main driving-shaft, a secondary shaft operatively connected to said main driving-shaft and carrying a cam and a pair of oppositely-arranged connected centrifugally-swinging arms, a series of valves in the gas-chamber, a plurality of rods forming valve-stems and each rod having independent connection with one of the valves, a weight slidably mounted on one of said rods, an arm adapted to be rocked by the cam to operate one or more of the valve-stems and means operated by the outward movement of said swinging arms for temporarily disengaging the weighted valve from said rock-arm.

2. In a gas-engine, the combination with a gas-chamber having valves, of a driving-shaft, a secondary shaft operated from the driving-shaft, a cam on said secondary shaft, a stem connected to one of the valves, a roller in the end of said stem traveling upon the surface of the cam, an arm rocked by said cam, two stems operated by said rock-arm and connected to the remaining valves, means for disengaging one of said stems from said rock-arm, and a weight slidably mounted on said disengaging stem.

3. In a gas-engine, the combination with the gas-chamber having valves provided with stems; one of said stems having a pivotal part provided with a notched forward end, of a driving-shaft, a gear-wheel on said driving-shaft, a secondary shaft, a gear-wheel on said secondary shaft meshing with the gear-wheel on the driving-shaft, a cam on said secondary shaft, a rock-arm operated by said cam and having a pin fitting in the notch of the pivotal stem part, centrifugal swinging arms pivoted to the gear-wheel on the secondary shaft, a second rock-arm operated by said centrifugal swinging arms and a connection between the second rock-arm and the pivotal part of the stem.

4. In a gas-engine, the combination with the gas-chamber having valves provided with stems; one of said stems having a pivotal part provided with a notched forward end, of a driving-shaft, a gear-wheel on said driving-shaft, a secondary shaft, a gear-wheel on said secondary shaft, meshing with the gear-wheel on the driving-shaft, a cam on said secondary shaft, a rock-arm operated by said cam and having a pin fitting in the notch of the pivotal stem part, centrifugal swinging arms pivoted to the gear-wheel on the secondary shaft, a second rock-arm operated by said centrifugal swinging arms, a connection between the second rock-arm and the pivotal part of the stem and a weight slidably mounted on the pivotal part of the stem.

5. In a gas-engine, the combination with the gas-chamber having a valve controlling the admittance of gas thereto, provided with a stem having a pivotal portion, of a driving-shaft, a secondary shaft operated from the driving-shaft, a cam on said secondary shaft, an arm rocked by said cam and having operative connection with the pivoted portion of the stem of the valve, a second rock-arm having connection with the pivotal portion of the valve-stem, swinging devices for tilting said second arm to lift the valve-stem from engagement with the first-mentioned arm and a sliding weight on the pivotal portion of the stem.

6. In a gas-engine, the combination with the gas-chamber having a valve the stem of which is provided with a pivotal part having a shoulder, of a rock-arm for giving a horizontal forward movement to said stem to open the valve and having a pin against which the shoulder of the stem rests, a second independent rock-arm, a connection between the pivotal part of the stem and the second rock-arm, centrifugal swinging devices operated when the speed of the engine is above normal for rocking the second rock-arm and lifting the pivotal part of said stem to disengage the shoulder of the stem from the pin of said first-mentioned rock-arm, a regulating-weight slidably mounted on the pivotal part of the stem.

7. A gas-engine having a cylinder, a driving-shaft, a secondary shaft, intermeshing gears connecting said shafts, a cam on said secondary shaft, a gas-chamber, valves in the gas-chamber, springs for normally maintaining said valves in a closed position, an arm rocked by said cam; one of said valves having a stem provided with a roller having direct operative contact with the cam, and the remaining valves having stems engaging with said rock-arm, oppositely-arranged connected centrifugally-swinging arms pivotally supported from the secondary shaft, a second rock-arm controlled by the centrifugal swinging arms and operatively connected to one of the valve-stems constructed and arranged for disengaging said valve-stem from said first-mentioned rock-arm, substantially as set forth.

8. A gas-engine having a frame, a cylinder, a driving-shaft, a secondary shaft, gears connecting said shafts, a gas-chamber, valves in said gas-chamber provided with stems, a lever supported from the frame and connected to one of said valve-stems, a cam on the secondary shaft, an arm rocked by said cam, and a rod connecting said rock-arm and the lever; one of the remaining valve-stems being connected to the rock-arm and another being operated directly from the cam.

9. A gas-engine having a frame, a cylinder, a driving-shaft, a secondary shaft, gears connecting said shafts, a gas-chamber, valves in said gas-chamber, provided with stems, a lever supported from the frame and connected to one of said valve-stems, a cam on the secondary shaft, an arm rocked by said cam, a rod connecting said rock-arm and lever; one of the remaining valve-stems being connected to the rock-arm, and means for disconnecting one of said valve-stems from the rock-arm to to prevent gas entrance when the speed is above normal, as set forth.

BARNARD ABEL.

Witnesses:
J. W. BORNE,
R. H. M. REID.